United States Patent Office 3,788,901
Patented Jan. 29, 1974

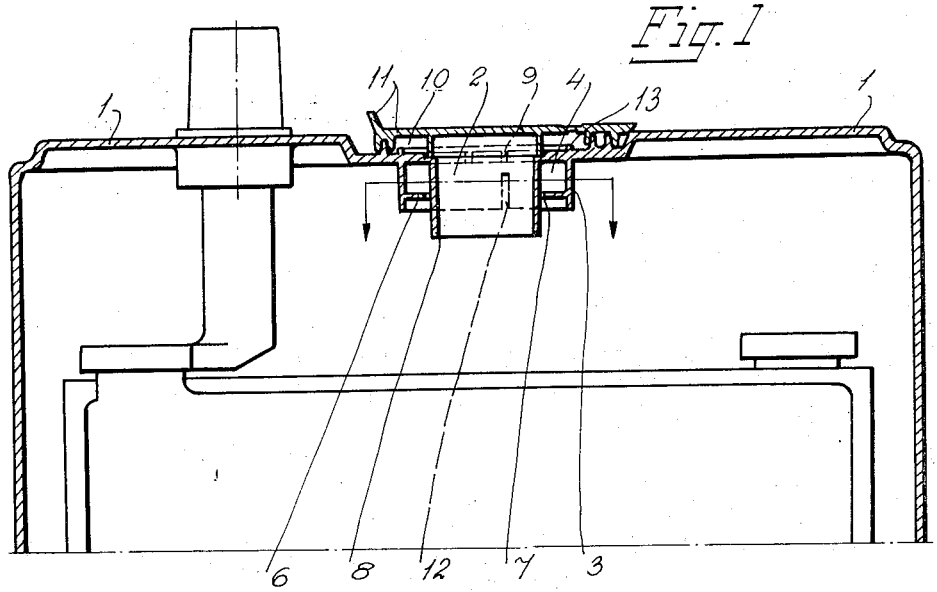
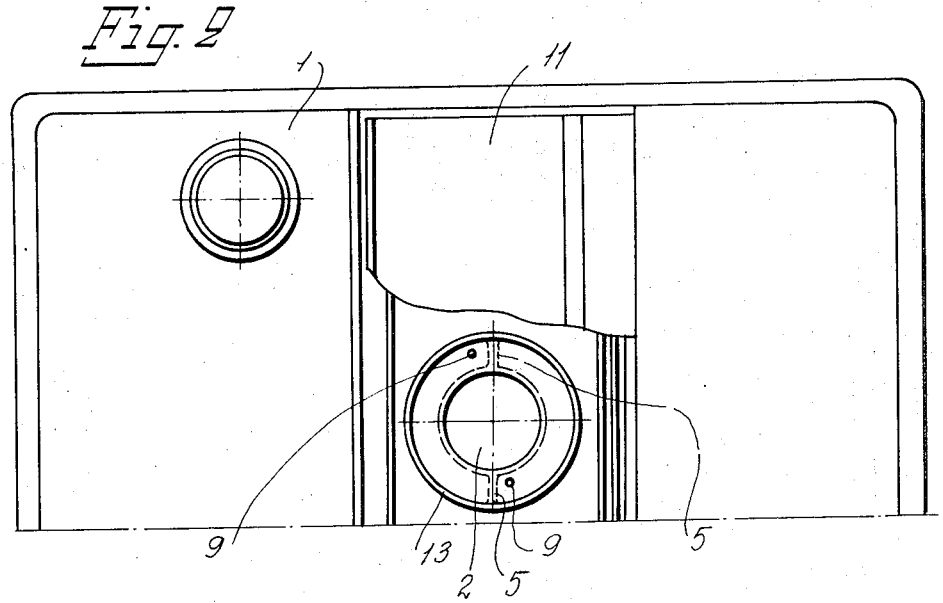

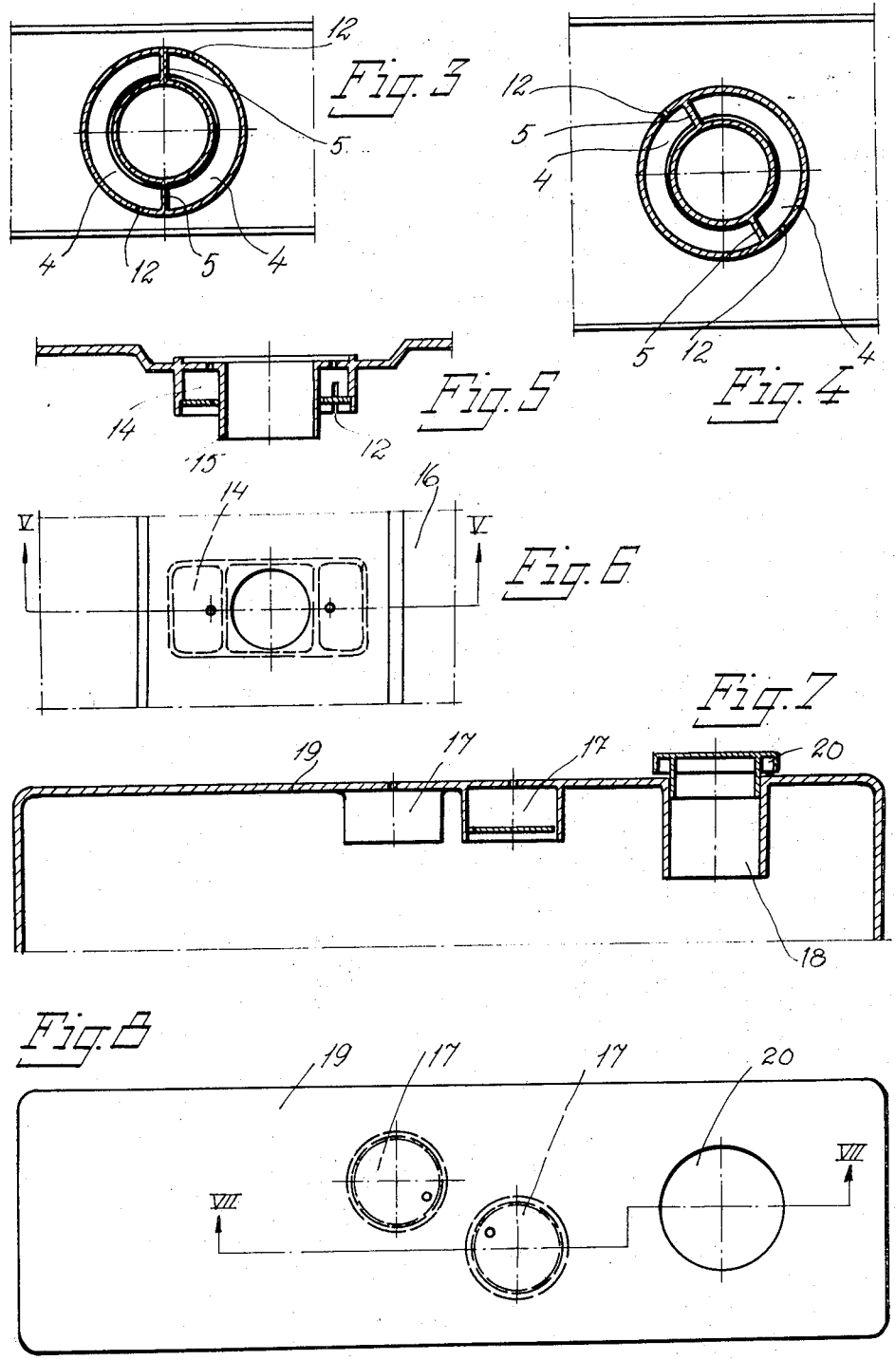

3,788,901
STORAGE BATTERIES
Rolf Filip Gunnar Thornblad, Hultsfred, Sweden, assignor to Globelite Batteries Canada Limited, Scarborough, Ontario, Canada
Filed Feb. 22, 1972, Ser. No. 228,256
Int. Cl. H01m 1/02
U.S. Cl. 136—170
5 Claims

ABSTRACT OF THE DISCLOSURE

In storage batteries of the lead-acid type which are especially used for vehicles such as automobiles and motor boats, a dual vent for each cell is provided so that gases may escape from the cells without carrying electrolyte along with them. The dual vent has two valves arranged to return electrolyte to the cell from which it has splashed, and they are situated so that gas escapes from the higher vent and relieves gas pressure from the lower vent to permit flow of electrolyte back to the cell.

BACKGROUND OF THE INVENTION

The present invention relates to an arrangement in storage batteries intended for use with traction vehicles. The term "storage battery" as used in this specification refers to a battery constructed of one or more cells.

Vehicle type storage batteries, e.g. batteries for cars and motor boats, are practically constantly being discharged and charged. During both of these processes, gases are given off by the electrolyte. With the majority of storage batteries provision is made, in the form of a valve arrangement, to enable these gases to pass from the electrolyte to the surroundings. If the vehicle to which the battery is fitted turns suddenly, lurches, or makes a similar violent movement, the battery will be tilted out of its normal attitude and the level of electrolyte is liable to rise to such an extent that electrolyte passes out through the valve arrangement as it splashes backwards and forwards and be entrained with the gases formed during discharging and charging of the battery. Further, the level of the electrolyte may be so high that electrolyte passes out through the valve arrangement and is entrained with the gases even thought the vehicle remains steady and the battery retains its normal attitude therein. It is obvious that if the battery is a lead-acid type battery the escaping droplets of sulphuric acid are liable to cause serious damage to surrounding vehicle components. Moreover, the outer casing of the battery may become filled with sulphuric acid, causing clothes brought into contact with the battery when handling the same to be burned. In order to avoid these inconveniences, it has hitherto been necessary to fill the battery to a relatively low electrolyte level, so that the electrolyte is unable to splash out through the valve arrangement under any circumstances. This, however, prevents the full capacity of the electro-chemical system from being used. It is known with respect to lead-acid storage batteries that not only the density of the electrolyte but also the quantity thereof is important to the efficiency of the active positive and negative lead bodies, which means that efficiency of the lead bodies, and thus the efficiency of the cells, increases with increased electrolyte density and an increased quantity of sulphuric acid calculated on the volume of a given storage battery. In the case of alkaline cells, a higher level of electrolyte extends the service intervals, i.e. the storage battery need not be refilled with distilled water as often as a storage battery having a lower level of electrolyte.

The object of the present invention is to eliminate the aforementioned disadvantages and to provide an arrangement in vehicle storage batteries provided with valve means which permits the escape of the gases formed while the battery is charging and discharging and to enable a high level of electrolyte to be used without electrolyte being entrained with departing gases or splashing out of the battery when the vehicle is subject to violent motions, such as lurching etc., during the simultaneous formation of gases, such escape of electrolyte from the confines of the battery otherwise causing corrosion damage to the surrounding vehicle components not resistant to corrosion, besides making it necessary to replenish the battery with electrolyte more often than would otherwise be required.

BRIEF SUMMARY OF THE INVENTION

This object is achieved by means of the arrangement according to the invention, which is mainly characterized by the fact that each cell of the storage battery has a second valve means arranged to co-act with the aforementioned, first, valve means, and that the two valve means either form and/or are associated means for returning any electrolyte entering thereinto as a result of vehicle movement back to the battery cell or cells, the position of the two valve means being such that gases formed during charging and discharging of the battery pass generally out of the cell or cells through one of the valve means, while electrolyte is drained through the other valve means or the associated means for return to the cell or cells.

According to one embodiment of the invention, the arrangement may include electrolyte filling tube passing through the cap on the battery casing, and two semi-circular chambers extending at right angles to the filling tube when seen in section and each having a ventilation and/or draining means arranged to encircle the tube.

According to a second embodiment of the invention the ventilation and/or draining means may be in the form of a narrow gap.

According to a third embodiment of the invention each chamber may be provided with an extra valve means in the form of a narrow slot extending parallel to the axis of the filling tube.

According to a fourth embodiment of the invention the ventilation and/or draining means may be spaced apart from each other. In this case, the ventilation and/or draining means shall be so positioned with respect to each other that they form an angle smaller than 45° to the longitudinal direction of the cell, seen in section perpendicular to the axis of the filling tube.

The filling openings of the storage battery may be closed either by means of a common lid or by separate plugs.

DESCRIPTION OF THE DRAWINGS

The invention will now be described with reference to the accompanying drawing, in which FIG. 1 is a cross-sectional view through one of the battery filling tubes, around which the ventilation means of the present invention is arranged.

FIG. 2 is a horizontal view of a portion of a battery, a part of the valve lid being cut away to show filling openings with valve means arranged concentrically therearound.

FIG. 3 is a horizontal section through a filling opening and valve means illustrated in FIG. 1. The section shows the most suitable position for the chambers in storage batteries having narrow cell compartments.

FIG. 4 is a horizontal section through a filling opening and valve means illustrated in FIG. 1. The section shows the most suitable position for the chambers in storage batteries having wide cell compartments.

FIG. 5 is a cross-sectional view of a number of battery filling openings, around which is arranged a ventilation means constructed in accordance with a modified embodiment of the invention.

FIG. 6 is a horizontal section through the filling openings and ventilation means illustrated in FIG. 5, showing how in accordance with this variant the ventilation means can be given a square or rectangular cross section.

FIG. 7 is a cross-sectional view through the filling opening of a single cell, the ventilation means being separate from the filling opening, and FIG. 8 is a horizontal section-view through a filling opening and the modified ventilation means illustrated in FIG. 7.

DESCRIPTION OF THE PREFERRED EMBODIMENTS

With special reference to FIGS. 1 and 2, the drawing shows a battery cover 1 provided with a valve lid 11 which is common to all valves and which closes filling openings 2, around which ventilation means 3 are arranged. The ventilation means—which are best seen in FIGS. 1, 3 and 4—comprise a cylindrical portion integrally formed with the battery cover 1 and including at least one pair of ventilation chambers 4 arranged to prevent the escape of electrolyte by splashing. The chambers are divided by walls 5 and a bottom plate 6, this latter being constructed in a manner such that an annular gap 7 is formed between the bottom plate and a level indicating pipe 8. This arrangement enables any electrolyte entering the chambers of the ventilation means to be drained away, by capillary action. Located in the battery cover 1 is a number of ventilation holes 9, one for each chamber 5, through which gas formed while the battery is charging and discharging can pass, via a common chamber located between the battery cover 1 and the valve lid 11.

Each ventilation chamber has a narrow slot 12, which terminates slightly short of the under surface of the battery cover 1. The purpose of the slot is to provide free passage for the gases through the ventilation means even should the level of electrolyte when the battery is stationary be horizontal and so high that it reaches to above the annular gap of the ventilation means.

The slots are suitably arranged as shown in FIGS. 4 and 5, to provide the best possible protection against the escape of electrolyte by splashing when the battery is shaken or subjected to violent or other movements.

The ventilation means present synchronously operating ventilation chambers, which serve alternately when the battery is shaken while gas is being formed during battery charging and discharging periods. If the battery is rocked or caused to tilt in one direction for some length of time, the ventilating function of the chamber lying on the lowest level of the incline is likely to be impaired owing to it being partly filled with electrolyte. With the arrangement of the present invention, the free chamber automatically becomes operative to allow gas to escape, thereby relieving the other chamber of gas pressure and enabling the electrolyte present therein to drain back to the cell under the capillary action of the annular gap.

By way of comparison it can be mentioned that if the system included only one chamber, rocking of the battery together with the pressure exerted by the gas formed during battery charging and discharging periods would result in the chamber being completely filled with electrolyte, which would be unable to run back into the cell. The electrolyte would be pumped up through the valve opening when the battery was shaken, and escape to the surroundings in the form of droplets or splashes.

One of the chambers of the ventilation means according to the invention is always empty of electrolyte, irrespective of the type of movement to which the battery is subjected when located in the vehicle, thereby enabling the gas to escape freely, to relieve the gas pressure on the co-acting chamber into which electrolyte has entered as a result of tilting of the battery. As soon as the electrolyte present in the chamber is relieved of the pressure of the gas departing from the cell, it can drain back to the cell at every free moment.

To enable the highest possible level of electrolyte to be maintained in a cell, the ventilation means are suitably located centrally in the cell compartment of a battery, where they are at the maximum distance from the acid with tilting of the cell from one side to the other. FIG. 3 shows the most suitable position of the chambers when the cell compartments are narrow, while FIG. 4 shows the most suitable positions of the chambers with wide cell compartments.

To facilitate the task of checking the battery cells for leaks by means of compressed air or a vacuum and filling of the battery with electrolyte by means of a vacuum, there can be provided around the filling and ventilation opening of each battery cell integral with the battery cover 1 a collar 13, on which the means used for the aforementioned tasks can be mounted.

Practical tests have shown that, in the case of batteries having different ventilation systems, the electrolyte can be driven intermittently from the battery when the battery is shaken during the charging period and the level of the electrolyte varies between 18 and 25 mm. from the lower flat surface of the battery lid to the level of the electrolyte. The ventilation means proposed in accordance with the invention enables the volume of the electrolyte to be maintained at about 8 cm. from the lower flat surface of the battery cover without risk of the electrolyte being splashed out of the battery and deposited on the battery casing or surrounding sensitive vehicle components.

The invention is not restricted to the above described embodiment, but can be modified within the scope of the accompanying claims.

FIGS. 5 and 6 illustrate one alternative embodiment of the arrangement of the present invention. With this embodiment the ventilation means and the level indicating pipe, indicated by the reference numerals 14 and 15 respectively, have a rectangular shape when viewed in section at right angles to the pipe and are formed integrally with the battery cover, indicated here by the reference numeral 16.

Another embodiment is illustrated in FIGS. 7 and 8, in which the chambers of the ventilation means, here indicated by the reference numeral 17 and provided with common walls. Further, the filling opening 18 is not encircled by the chambers. The figures show in other respects a single cell, having a cell cap 19 and a cell plug 20.

What I claim is:

1. In a storage battery having ventilation means to enable gases formed during battery charging and discharging periods to vent from the battery, the improvement wherein each battery cell is provided with an electrolyte filling tube and a pair of vent chambers encircling said filling tube and extending perpendicular to the axis thereof; said pair of vent chambers being defined by two concentrical semi-circles and two walls joining said semi-circles; each of said pair of vent chambers having at least one vent hole with gas communication to the ambient and having means for returning to the battery cell electrolyte which enters the vent chamber as a result of movement of the battery; the position of the pair of vent chambers and their vent holes being such that with changing positions of the battery during movement of the vehicle, the vent holes adopt different heights with respect to each other so that gases may pass out of the battery cell through the highest situated vent hole with respect to the inclination of the battery.

2. Apparatus according to claim 1, where the electrolyte draining means in each of said vent chambers is in the form of a narrow gap.

3. Apparatus according to claim 1 where said pair of vent chambers and said electrolyte filling tube for each battery cell are formed in a battery cover for said battery.

4. Apparatus according to claim 3, where a collar is formed integral with the battery cover and surrounding the electrolyte filling tube of each battery cell.

5. Apparatus according to claim 1, wherein each said vent chamber includes an extra vent in the form of a slit disposed parallel with the axis of the electrolyte filling tube.

References Cited

UNITED STATES PATENTS

| | | | |
|---|---|---|---|
| 1,035,178 | 8/1912 | Galloway | 136—177 |
| 1,705,021 | 3/1929 | Lea | 136—170 |
| 1,459,121 | 6/1923 | Wiel | 136—177 |
| 3,666,564 | 5/1972 | Corbin et al. | 136—177 |
| 3,506,497 | 4/1970 | Bell et al. | 136—177 |
| 3,560,266 | 2/1971 | Mossford | 136—177 |

DONALD L. WALTON, Primary Examiner

U.S. Cl. X.R.

136—177